(12) United States Patent
Bell et al.

(10) Patent No.: US 6,519,101 B2
(45) Date of Patent: Feb. 11, 2003

(54) PRECISELY ADJUSTABLE OPTICAL DEVICE HAVING VIBRATION AND TEMPERATURE STABILITY

(75) Inventors: Alan David Bell, Fort Wayne, IN (US); James Edward Bowman, Fort Wayne, IN (US); Shaun Richard Cronin, Fort Wayne, IN (US); Robert Alan Hookman, Fort Wayne, IN (US); Benjamin Joffe, Fort Wayne, IN (US); Eric Johann Schacher, Fort Wayne, IN (US); Robert Edward Wilcox, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/054,384

(22) Filed: Jan. 22, 2002

(65) Prior Publication Data

US 2002/0075581 A1 Jun. 20, 2002

Related U.S. Application Data

(62) Division of application No. 09/432,363, filed on Nov. 3, 1999.

(51) Int. Cl.⁷ .............................. G02B 1/00; G02F 1/00
(52) U.S. Cl. ...................... 359/896; 359/819; 359/822; 359/872; 359/876; 359/503
(58) Field of Search ................................ 359/896, 822, 359/818, 819, 876, 872, 430

(56) References Cited

U.S. PATENT DOCUMENTS

| | | | |
|---|---|---|---|
| 3,204,471 A | 9/1965 | Rempel | 74/89 |
| 3,352,524 A | 11/1967 | Rossi | 248/278 |
| 3,359,812 A | 12/1967 | Everitt | 74/89.15 |
| 3,436,050 A | 4/1969 | Tibbals, Jr. | 248/487 |
| 3,588,025 A | 6/1971 | Gersman | 248/481 |
| 3,596,863 A | 8/1971 | Kaspareck | 248/278 |
| 3,642,353 A | 2/1972 | Field | 350/310 |
| 3,964,336 A | 6/1976 | Harmening | 74/501 M |
| 4,023,891 A | 5/1977 | Chadwick | 350/288 |
| 4,060,314 A | 11/1977 | Heinz | 350/285 |
| 4,060,315 A | 11/1977 | Heinz | 350/289 |
| 4,088,396 A | 5/1978 | Edelstein | 350/252 |
| 4,298,248 A | 11/1981 | Lapp | 350/310 |
| 4,447,139 A | 5/1984 | Biber | 350/522 |
| 4,563,058 A | 1/1986 | Yardy | 350/166 |
| 4,573,794 A | 3/1986 | Covey et al. | 356/346 |
| 4,621,899 A | 11/1986 | Hoult et al. | 350/321 |
| 4,640,591 A | 2/1987 | Cutburth | 350/632 |
| 4,707,585 A | 11/1987 | Monteith et al. | 219/121 LV |
| 4,863,243 A | 9/1989 | Wakefield | 350/321 |
| 4,880,301 A | 11/1989 | Gross | 350/636 |
| 4,884,882 A | 12/1989 | Schnarch | 350/634 |
| 4,887,894 A | 12/1989 | Gluzerman et al. | 350/636 |

(List continued on next page.)

Primary Examiner—Cassandra Spyrou
Assistant Examiner—Leo Boutsikaris
(74) Attorney, Agent, or Firm—Baker & Daniels

(57) ABSTRACT

An adjustable optical device including an optical element, a housing having an adjusting post fixed thereto, the optical element mounted to the housing, the housing adjusting post having a plane of movement, and an adjustment mechanism, the housing flexibly connected to the adjustment mechanism, the adjustment mechanism comprising a moving adjusting member in sliding engagement with the housing adjusting post, one of the adjusting member and the housing adjusting post comprising a wedge. The housing adjusting post is urged into movement in its plane of movement in response to relative movement between the adjusting member and the adjusting post, whereby the orientation of the optical element relative to the adjusting mechanism is adjusted by movement of the moving adjusting member.

28 Claims, 11 Drawing Sheets

U.S. PATENT DOCUMENTS

| | | | |
|---|---|---|---|
| 4,923,162 A | 5/1990 | Fleming et al. | 248/276 |
| 4,925,288 A | 5/1990 | Harris | 350/636 |
| 5,004,205 A | 4/1991 | Brown et al. | 248/476 |
| 5,195,707 A | 3/1993 | Ignatuk et al. | 248/179 |
| 5,353,167 A | 10/1994 | Kuklo et al. | 359/876 |
| 5,418,652 A | 5/1995 | Gnann | 359/871 |
| 5,703,683 A | 12/1997 | Hunt et al. | 356/301 |
| 6,170,795 B1 * | 1/2001 | Wayne | 359/818 |

* cited by examiner

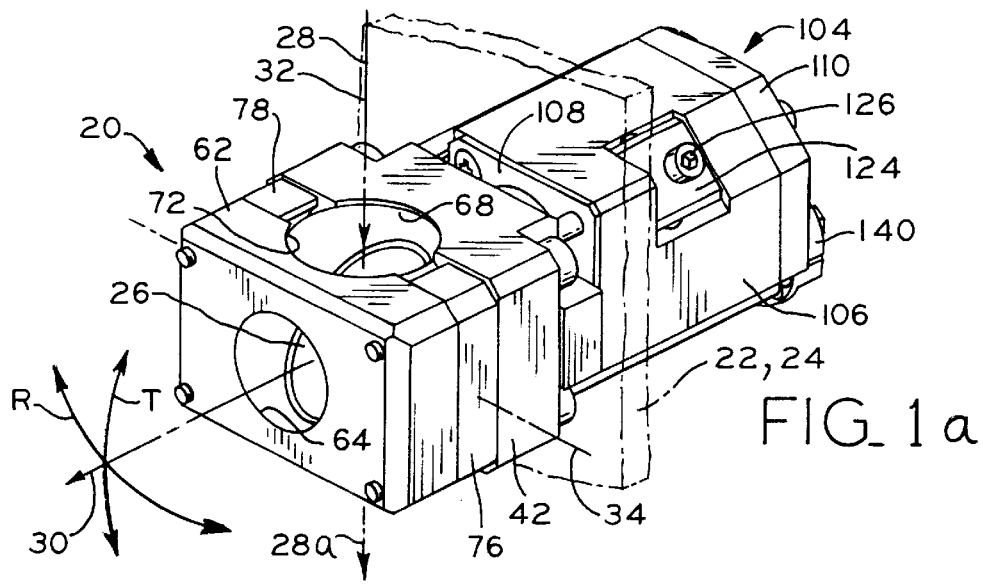
FIG_1a
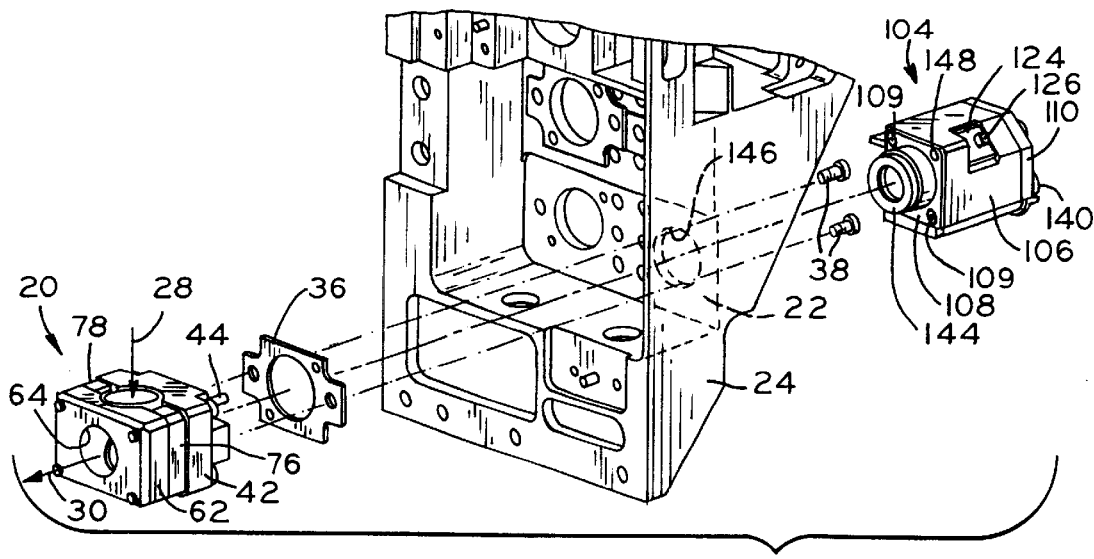
FIG_1b
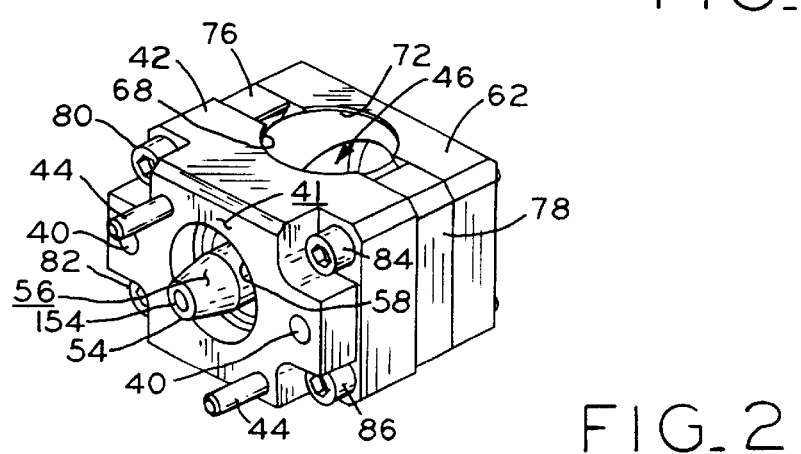
FIG_2

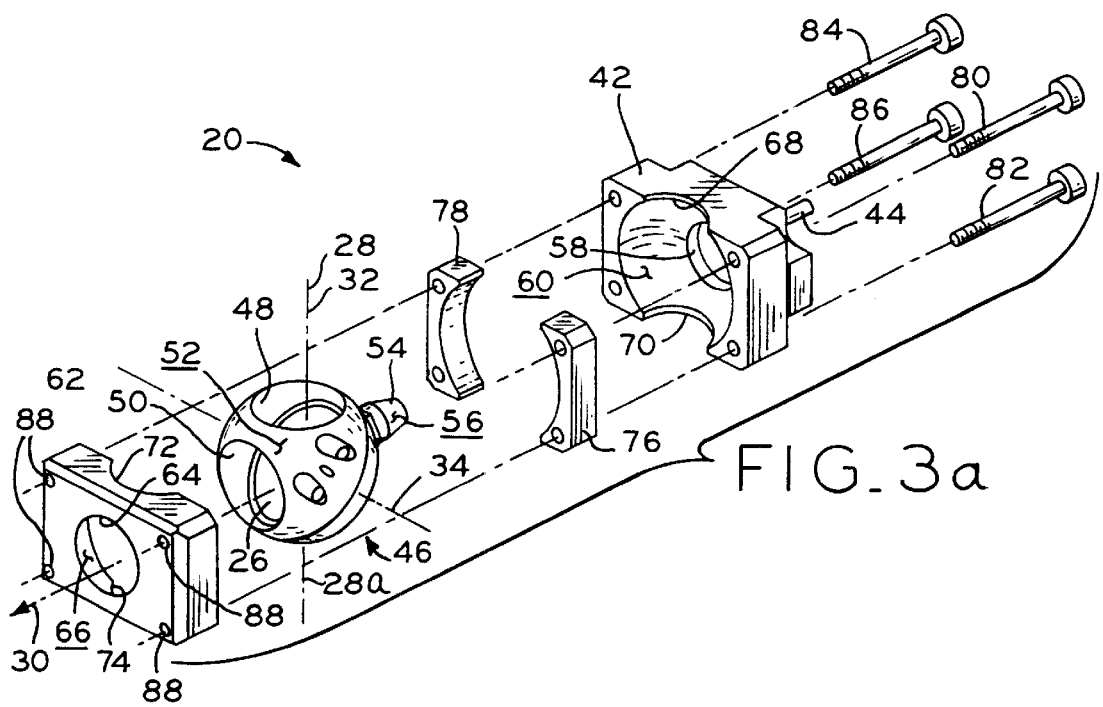
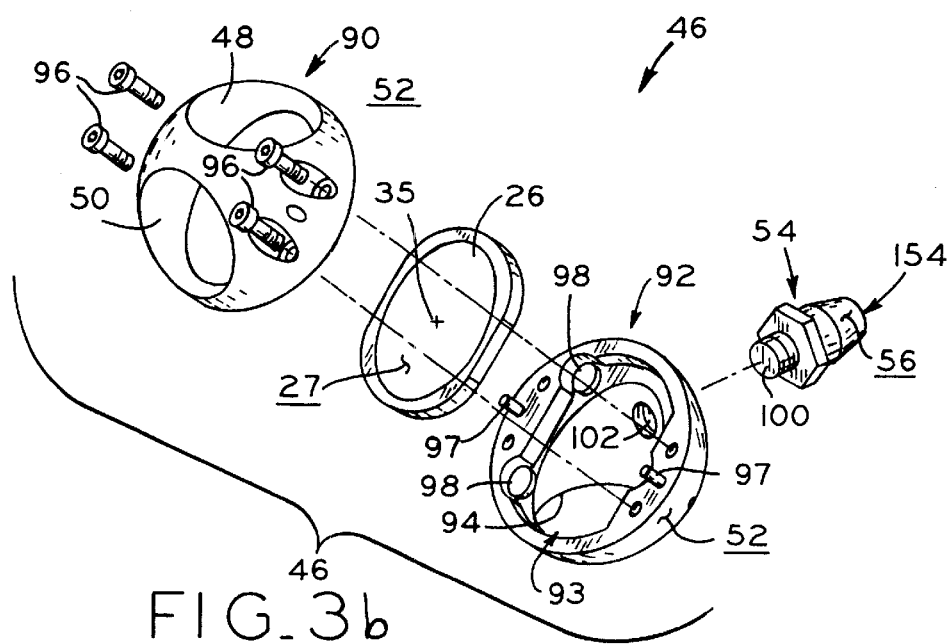

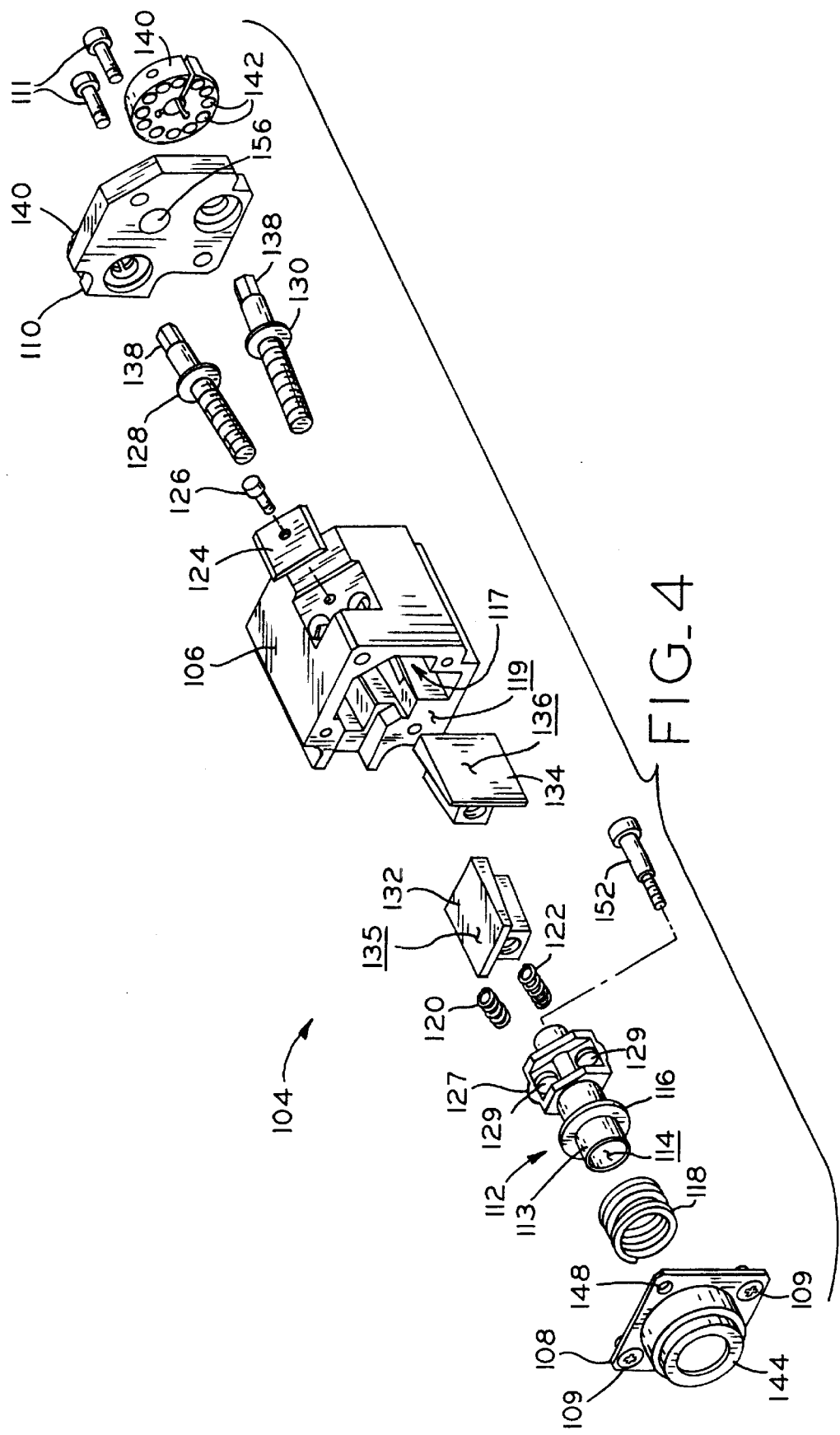

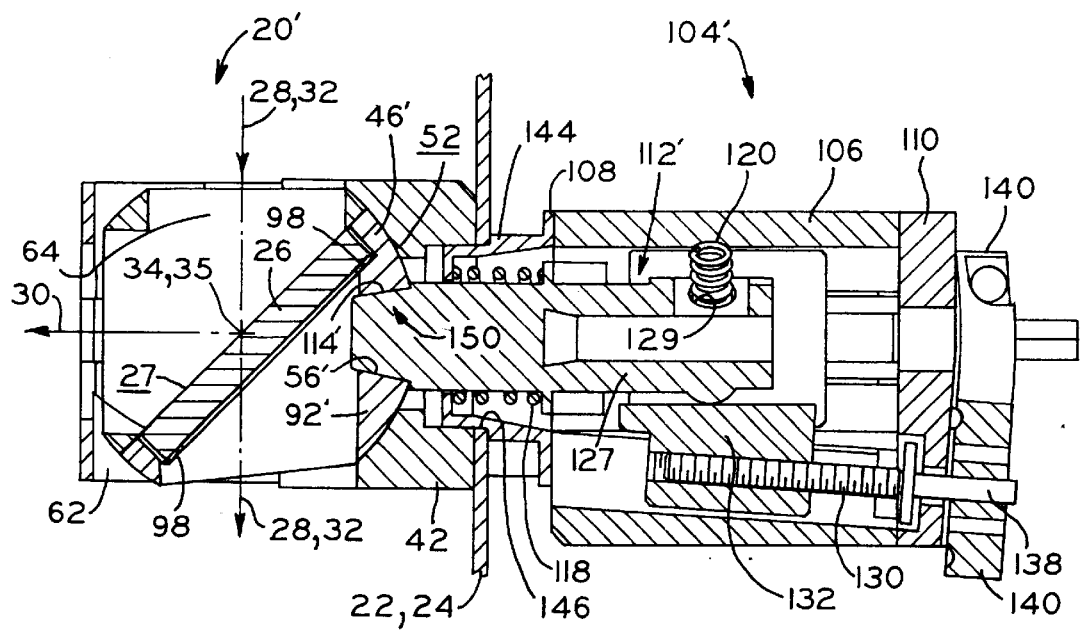
FIG_6b
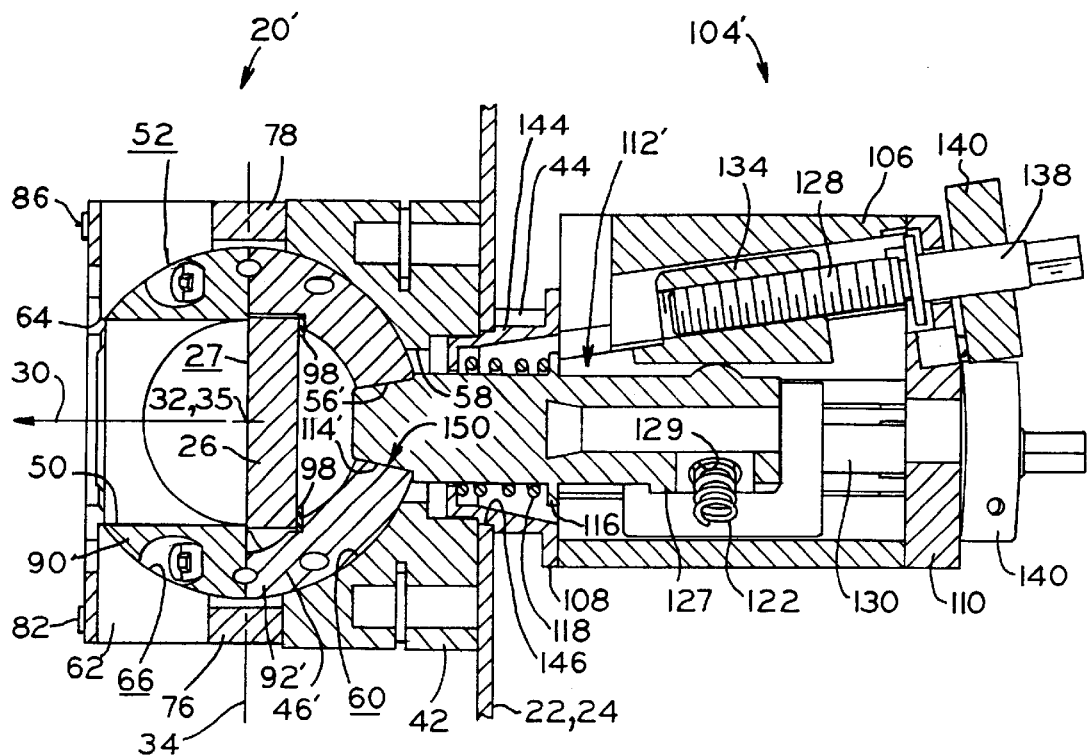
FIG_6a

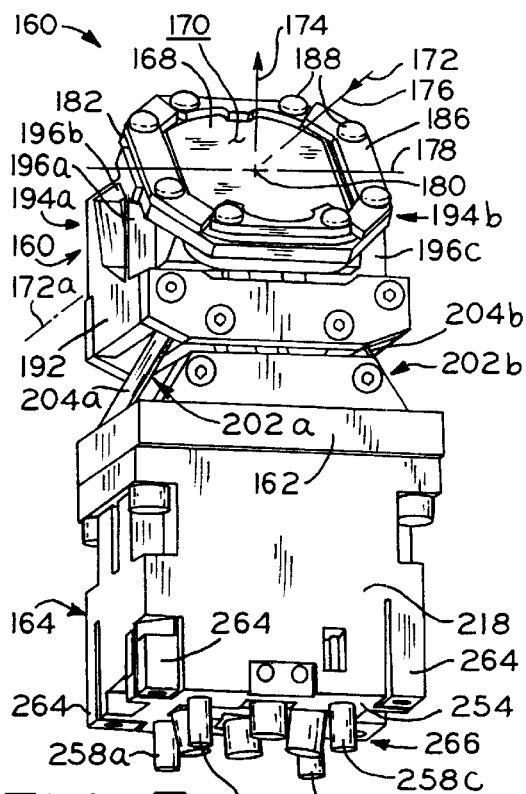
FIG_7
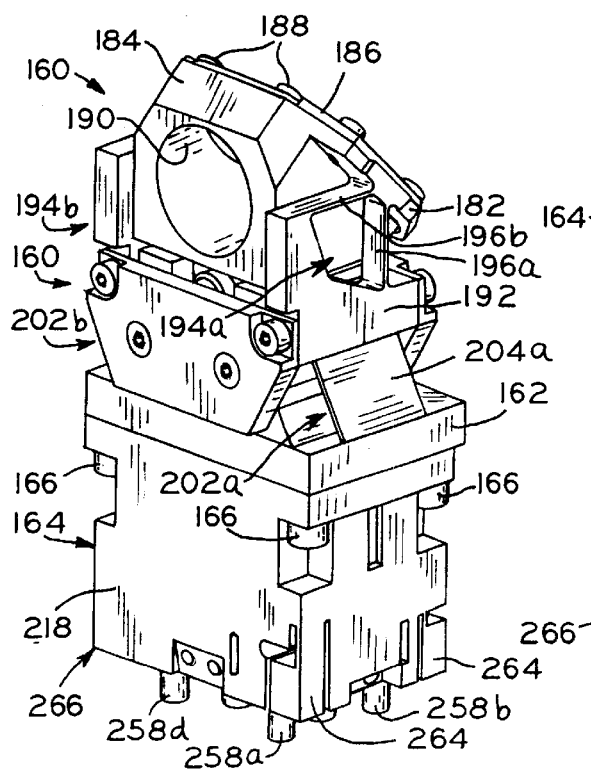
FIG_8a
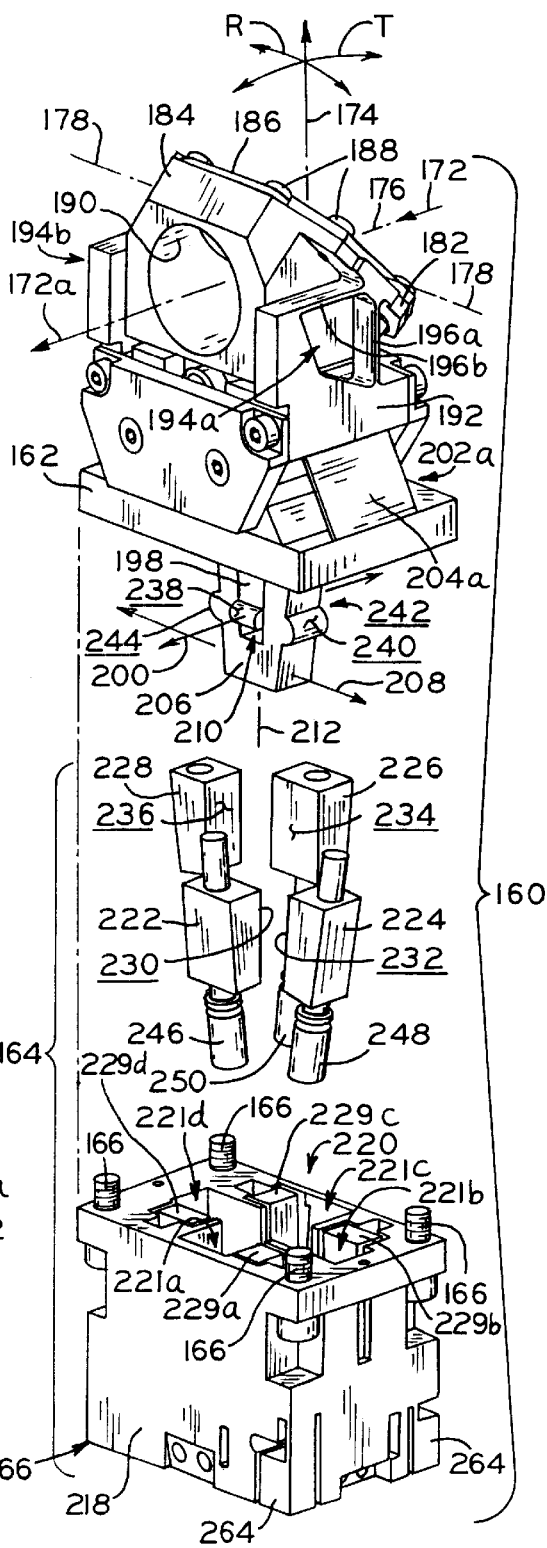
FIG_8b

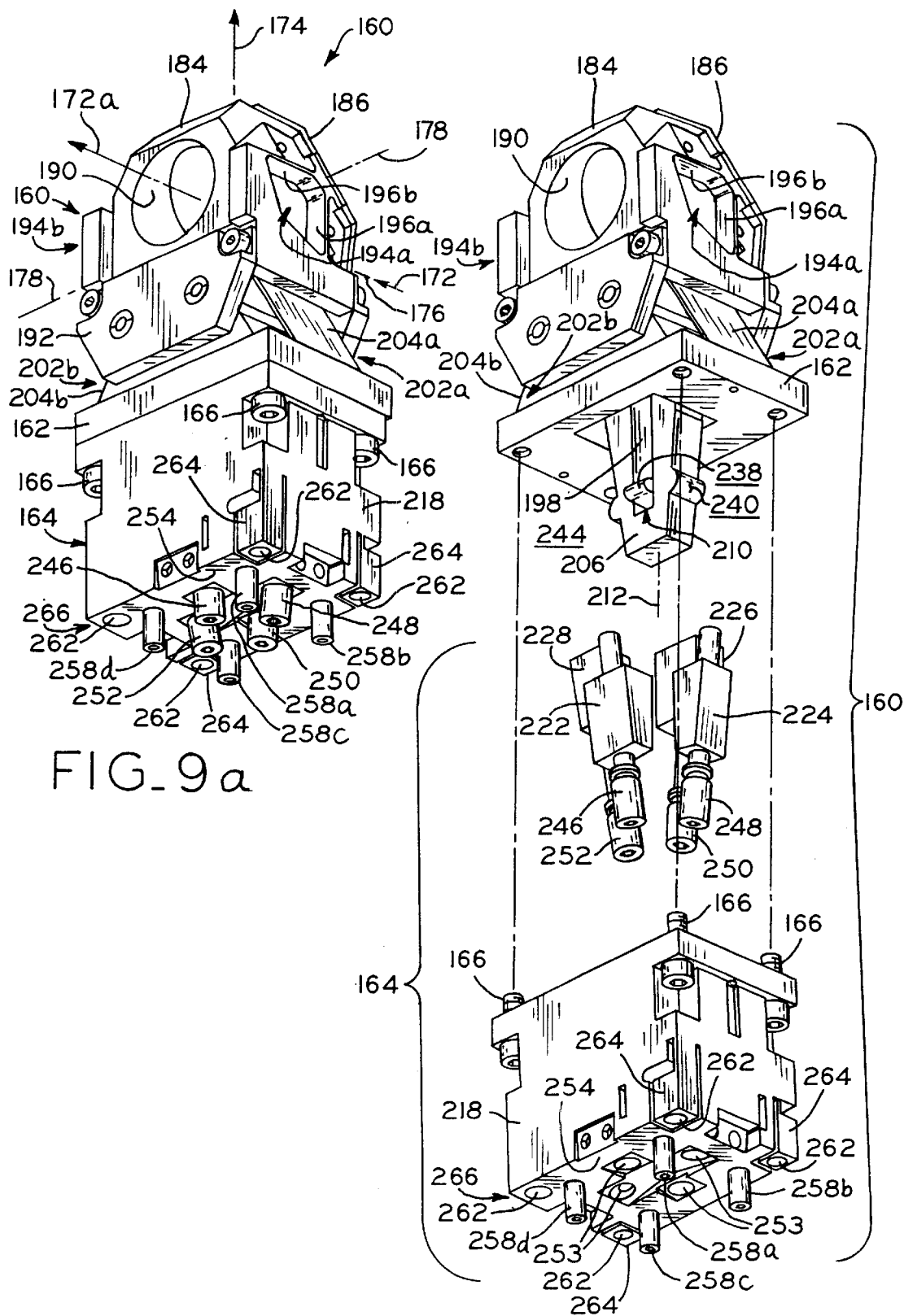

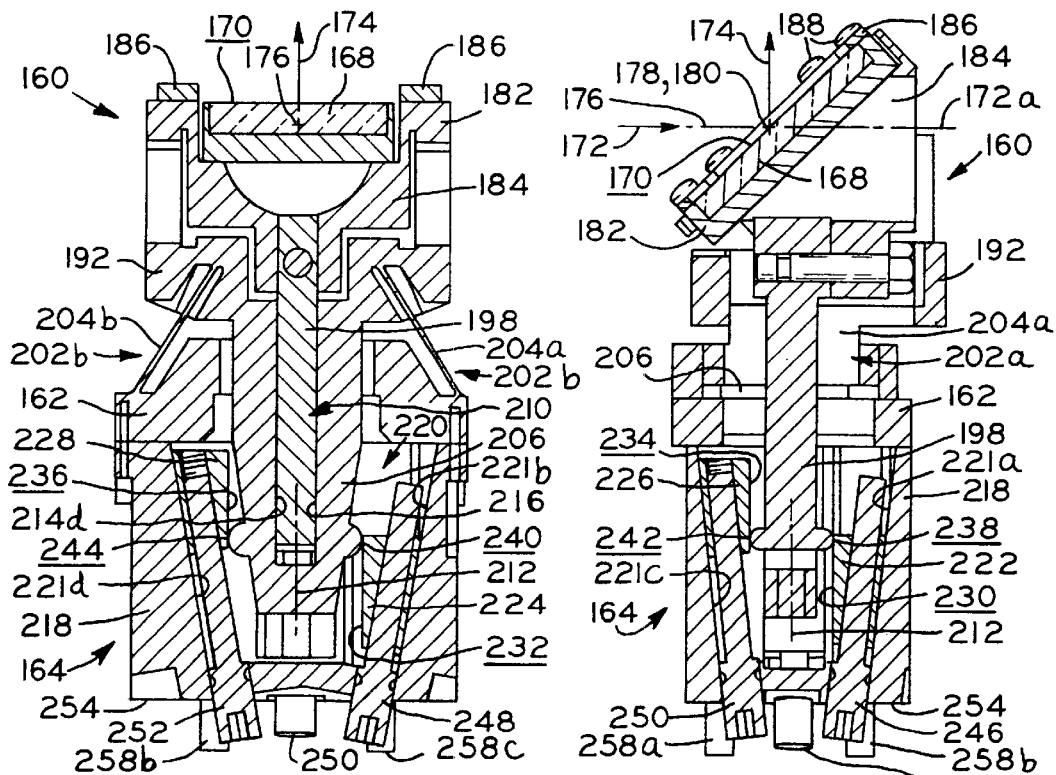
FIG_11
FIG_12
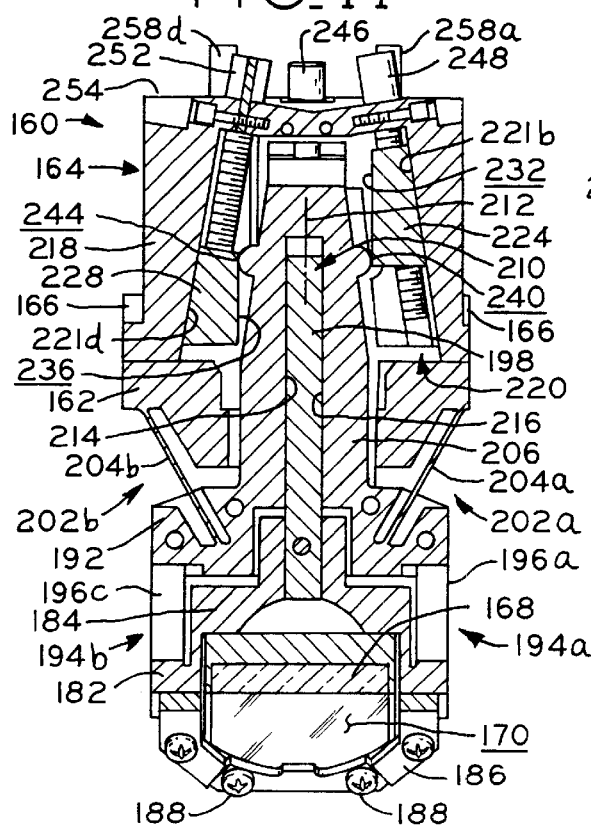
FIG_13
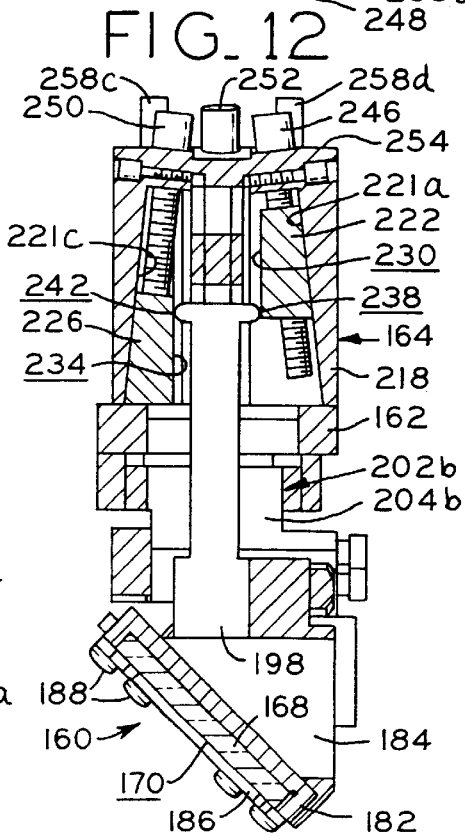
FIG_14

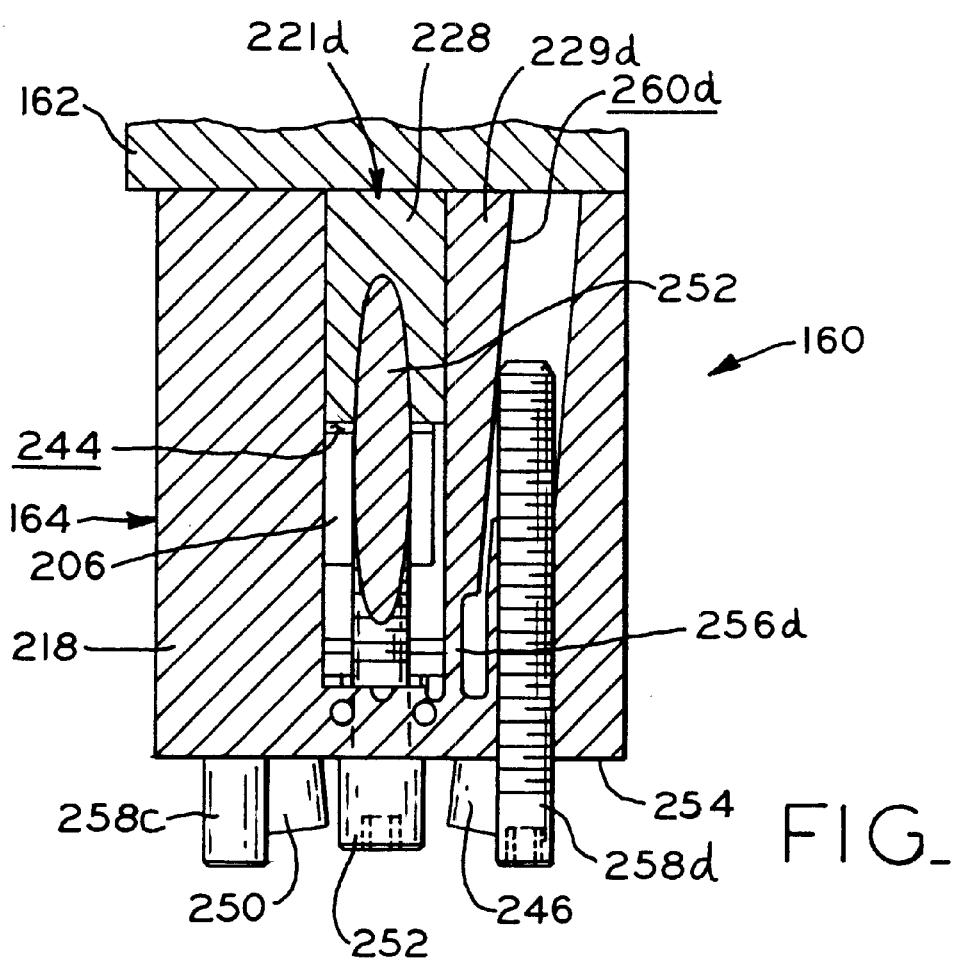
FIG_15

PRECISELY ADJUSTABLE OPTICAL DEVICE HAVING VIBRATION AND TEMPERATURE STABILITY

CROSS-REFERENCE TO RELATED APPLICATION

This is a Divisional Application of patent application Ser. No. 09/432,363, filed Nov. 3, 1999.

BACKGROUND OF THE INVENTION

1. Field of the Invention

The present invention relates to optical devices which include an adjustable optical element which may be adjusted with high precision, and in particular to such optical devices which are adjustable about two perpendicular axes and are vibration and temperature stable.

2. Description of the Related Art

Adjustable optical devices may be used in relay optics systems which divide and coregister multiple optical beams. In some cases, such systems must be accommodated in an apparatus having limited package space, for instance, a satellite. A relay optics system for a satellite is described in U.S. Pat. No. 4,801,202, entitled "Method and Apparatus For Radiometer Star Sensing", the disclosure of which is expressly incorporated herein by reference. This patent describes an earth scanning radiometer instrument which uses a mirror to collect radiation, and transfers an image of the radiation onto the surface of a detector which converts the incident radiation into an electrical signal, which is then converted into a digital image. To provide images across a broad spectrum of radiation the collected radiation is divided and directed onto several detector surfaces sensitive to discrete wavelengths. Such division is referred to in the art as relay optics. It is to be understood that, in the context of the following discussion, the term "optical" does not relate solely to the visible light spectrum; rather, the term relates to radiation across a broad band of wavelengths, including those on which visible light is transmitted.

Proper digital imaging requires that the divided detectors be aligned with one another, i.e., coregistered. Relay optics systems require physical space and contribute mass to the structure on which they are installed. In particular, where that structure is a satellite, the shortcomings of previous relay optics systems are, in part, associated with their package requirements and weight. Further, accessibility to the optical elements which comprise the system, once installed, is often difficult. The mechanical motions associated with adjustment of the optical elements are very fine, and the movements associated therewith must be free of backlash. In previous relay optics systems, complex mechanical mechanisms are necessary to facilitate adjustment of the divided beams onto the coregistered detectors. Moreover, the elements must not move after being properly adjusted, and certainly not after launch of the satellite. Further, the adjustment mechanism is subjected to substantial vibration, particularly during launch, and once in orbit is subjected to temperatures which may vary in a range from about $-20°$ C. to about $70°$ C. The vibratory inputs and temperature variations to which previous adjustment mechanism are subjected may affect proper adjustment of the optical element.

Moreover, the adjustment mechanism itself may contribute significantly to the relay optics system, and thus to the weight of, and the package space which must be accommodated by, the satellite. Further, some earth-bound communication systems may have limited package space in which a relay optics system must be accommodated.

Means for providing an improved, easily yet finely adjustable optical device and associated adjustment mechanism for a relay optics system, which is small in size, lightweight, vibration and temperature stable, and capable of high-resolution adjustment to produce a coregistered image is highly desirable, particularly for use in satellite-based and some earth-bound relay optics systems.

SUMMARY OF THE INVENTION

The present invention provides a lightweight, precisely adjustable optical device which may be used in a relay optics system which divides and coregisters multiple optical beams and includes a flexure mechanism to produce high-resolution adjusting movements of the optical element. The device is lightweight and occupies limited volume, making it suitable for spaceflight use. The device provides means for locking the adjusted optical element into place, thereby providing vibration stability, and is comprised of materials having common coefficients of thermal expansion, thereby providing thermal stability.

In one embodiment, the movement between the housing, to which the optical element is mounted, and the base portion, which is attached to the satellite chassis, is substantially frictionless.

In another embodiment, the adjusting device is separable from the optical device, the latter of which is attached to the satellite chassis; the optical element is locked in position after adjustment. The adjusting device is disengaged from the optical device after locking the optical element in position, and does not fly with the satellite.

The present invention provides an adjustable optical device including an optical element, a housing having an adjusting post fixed thereto, the optical element mounted to the housing, the housing adjusting post having a plane of movement, and an adjustment mechanism. The housing is flexibly connected to the adjustment mechanism, which includes a moving adjusting member in sliding engagement with the housing adjusting post. One of the adjusting member and the housing adjusting post includes a wedge, and the housing adjusting post is urged into movement in its plane of movement in response to relative movement between the adjusting member and the adjusting post, whereby the orientation of the optical element relative to the adjusting mechanism is adjusted by movement of the moving adjusting member.

The present invention also provides an adjustable optical device including a housing having a substantially spherical outer surface, an optical element disposed within the housing, a base having a substantially spherical inner surface, the base inner surface overlying a portion of the housing outer surface, the base inner surface and the housing outer surface frictionally engaged, and a cover having a substantially spherical inner surface, the cover inner surface overlying a portion of the housing outer surface, the cover inner surface and the housing outer surface frictionally engaged. The housing is disposed between the base and the cover, and the cover is attached to the base. Frictional engagement between the base and the housing, and the cover and the housing, has a first level and a second level. The first level is substantially less than the second level, whereby relative movement between the housing and the base is resisted yet permitted at the first frictional engagement level. Relative movement between the housing and the base is prevented at the second frictional engagement level.

The present invention also provides an adjustable optical device including an optical element and a housing, the optical element disposed within the housing. Also included is a base having a substantially spherical inner surface. The housing has a substantially spherical outer surface engaged with the base substantially spherical inner surface. The housing is provided with a driven surface, and has a tilt axis and a roll axis about which the orientation of the housing relative to the base is adjusted. An adjustment device has an operating position relative to the base, and includes a moving adjusting mechanism which includes a driving surface, the driven and driving surfaces engaged in the operating position. The adjusting mechanism includes a lever operatively connected to the driving surface, the lever having two substantially perpendicular degrees of movement. Movement of the housing about one of its tilt and roll axes is in response to movement of the lever along one of its degrees of movement.

The present invention further provides an adjustable optical device including an optical element, a base, and a housing, the optical element mounted in the housing. The housing is coupled to the base and has at least one degree of movement relative to the base, whereby the orientation of the optical element relative to the base is adjusted by the movement of the housing in the at least one degree of movement. Also included is an adjustment device detachably connected to the base and having a moving adjusting mechanism. When the adjustment device is connected to the base, the adjusting mechanism is operatively connected to the housing to move the housing in its at least one degree of movement in response to movement of the adjusting mechanism. The housing is selectively locked to the base and remains selectively locked to the base when the adjustment device is detached from the base.

The present invention also provides an adjustable optical device including a housing having a spherical outer surface, the housing outer surface having a radius of curvature, an optical element mounted within the housing, a base having a spherical inner surface, the base inner surface having substantially the same radius of curvature as the housing outer surface, and a cover having a spherical inner surface, the cover inner surface having substantially the same radius of curvature as the housing outer surface. The cover and the base inner surfaces are in frictional engagement with the housing outer surface and are moveable relative to each other to thereby selectively frictionally clamp the housing against movement relative to the base and the cover.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1a is a perspective view of a first embodiment of an adjustable optical device and its associated adjustment device according to the present invention, shown interconnected through a mounting plate to which the inventive optical device is attached;

FIG. 1b is an exploded view of the assemblage shown in FIG. 1;

FIG. 2 is a rear perspective view of the adjustable optical device of FIG. 1;

FIG. 3a is an exploded view of the adjustable optical device of FIG. 1;

FIG. 3b is an exploded view of the spherical housing and optical element which comprises the optical device of FIG. 1;

FIG. 4 is a an exploded view of the adjustment device of FIG. 1;

FIG. 6a is a first cross sectional side view of a third embodiment of an adjustable optical device and its associated adjustment device according to the present invention, shown interconnected through a mounting plate to which the inventive optical device is attached;

FIG. 6b is a second cross sectional view of the assemblage shown in FIG. 6a;

FIG. 7 is a lower front perspective view of a fourth embodiment of an adjustable optical device according to the present invention;

FIG. 8a is an upper rear perspective view of the adjustable optical device of FIG. 7;

FIG. 8b is an exploded view of the adjustable optical device of FIG. 8a;

FIG. 9a is a lower rear perspective view of the adjustable optical device of FIG. 7;

FIG. 9b is an exploded view of the adjustable optical device of FIG. 9a;

FIG. 11 is a cross sectional rear view of the adjustable optical device of FIG. 10a along line 11—11;

FIG. 12 is a cross sectional side view of the adjustable optical device of FIG. 10b along line 12—12;

FIG. 13 is a cross sectional front view of the adjustable optical device of FIG. 10c along line 13—13;

FIG. 14 is a cross sectional side view of the adjustable optical device of FIG. 10c along line 14—14; and FIG. 15 is a cross sectional, fragmentary side view of the adjustable optical device of FIG. 10c along line 15—15.

Figure 1C:
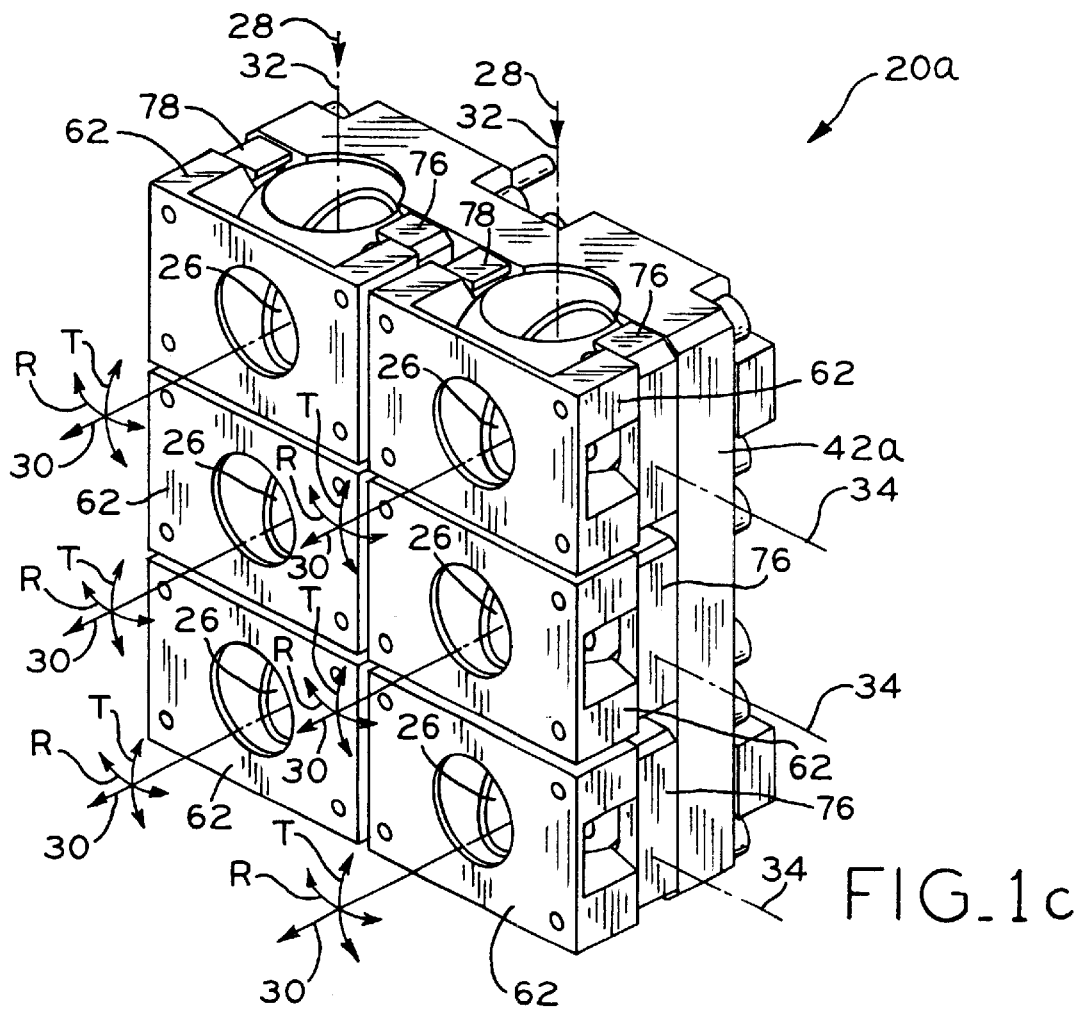
FIG. 1c is a perspective view a second embodiment of an adjustable optical device according to the present invention.

Corresponding reference characters indicate corresponding parts throughout the several views. The exemplifications set out herein illustrate different embodiments of the present invention, in several forms, and such exemplifications are not to be construed as limiting the scope of the invention in any manner.

DETAILED DESCRIPTION OF THE INVENTION

Referring to FIGS. 1a and 1b, there is shown a first embodiment of an adjustable optical device and its associated adjustment device according to the present invention. Adjustable optical device 20 is secured to mounting plate 22 of satellite chassis 24. Chassis 24 may have a plurality of devices such as device 20 attached to it, each dedicated to conveying radiation of a certain wavelength to a detector (not shown). Device 20 includes movable optical element 26 which receives light or other radiation along input axis 28.

Optical element 26 has reflective surface 27 and may be a fold mirror or a beam splitter, and has an output axis 30 along which light is directed to the detector or to another optical device mounted to the chassis. If optical element 26 is a beam splitter, only a portion of the light received along input axis 28 will be directed along output axis 30; another portion of the light, having a different wavelength, will pass through the beam splitter along output axis 28a which is substantially collinear with input axis 28. Light directed along axis 28a is received by a detector or by another optical device.

Optical element 26 is adjustable about roll axis 32, in the directions indicated by arrow R, and about tilt axis 34, in the directions indicated by arrow T. As shown, roll axis 32 is collinear with input axis 28, but these are individual axes which may be slightly displaced relative to one another. Roll and tilt axes 32, 34 intersect at optical center 35 (FIG. 3b) of optical element 26, which lies on surface 27. Optical device 20 may be adjusted generally along the direction of output axis 30 by means of shim(s) 36 placed between optical device 20 and mounting plate 22. It is envisioned that the range of adjustment of the optical center generally along the axis of output axis 30 which should be accommodated with device 20 is on the order of ±0.002 inch, with shim(s) 36 individually providing a linear resolution of about 0.001 inch.

Referring to FIG. 1b, fasteners 38 extend through holes provided in mounting plate 22 and shim 36, and are threadedly received in tapped holes 40 (FIG. 2) provided on "bottom" surface 41 of optical device base 42, thereby attaching optical device 20 to satellite chassis 24. Alignment pins 44 extend from bottom surface 41 in directions generally parallel with output axis 30 and project through holes provided therefor in shim 36 and mounting plate 22, thereby substantially aligning optical device 20 to the satellite chassis. Pins 44 are used for aligning the adjustment device to the optical device during adjustment of the optical element, as will be described further hereinbelow.

Referring to FIGS. 3a and 3b, optical element 26 is disposed in housing 46 which has openings 48 and 50 through which input axis 28 and output axis 30 respectively extend. Housing 46 has spherical outer surface 52 which is round to within a tolerance of 0.0001 inch. The center of curvature of spherical outer surface 52 is coincident with optical center 35 of optical element 26. Note that roll axis 32 and tilt axis 34 are fixed relative to optical element 26, and optical element 26 is fixed relative to housing 46; thus, adjustment of housing 46 about the tilt and roll axes will likewise adjust optical element 26 about these axes. Housing 46 is provided with stem 54 which projects from spherical surface 52 and is provided with frustoconical driven surface 56. Stem 54 extends through hole 58 provided in spherical inner surface 60 of base 42. Surface 60 is also round to within 0.0001 inch. Spherical outer surface 52 and spherical inner surface 60 have a common nominal radius of curvature, and are in surface-to-surface contact with one another. Housing 46 is disposed between base 42 and cover 62. Cover 62 is provided with opening 64 through which output axis 30 extends, and has spherical inner surface 66 which is round to within 0.0001 inch and also has a center of curvature common to surfaces 52 and 60. Surface 66 has surface-to-surface contact with housing surface 52. Opposite side faces of base 42 and cover 62 are respectively provided with scallops 68, 70 and 72, 74, as shown in FIG. 3a. These scallops partially define openings in device 20 through which input axis 28 and output axis 28a extend.

Disposed between base 42 and cover 62, on opposite radial sides of housing 46 are spacer member 76 and stop member 78. Spacer member 76 is nearly identical with stop member 78 except that it is slightly thicker in a direction generally along output axis 30. Fasteners 80, 82, 84 and 86 extend through holes provided in base 42, spacer member 76 or stop member 78, and cover 62. These fasteners are threadedly received in cover holes 88. Upon initial assembly of device 20, fasteners 80 and 82, which extend through spacer member 76, are tightened to a final torque, and spacer member 76 is placed in compression between base 42 and cover 62. Fasteners 84 and 86, however, which extend through stop member 78, are not so torqued, and stop member 78 is not under compression between base 42 and cover 62. In this state of assembly, surface-to-surface contact, and a light frictional engagement level exists between housing surface 52 and surfaces 60 and 66 of the base and cover, and a small gap, on the order a few ten thousands of an inch, may exist between an axially facing side of stop member 78 and the adjacent, axially facing side of base 42 or cover 62. In this state of light frictional contact, housing 46 is not clamped between the base and the cover, and its adjustment about roll axis 32 and tilt axis 34 is facilitated by movement of stem 54. Movement is imparted to stem 54 by exertion of a force against driven surface 56 through the adjustment device, as further explained below. For now, suffice it to say that movement of stem 54 provides adjusting movement of optical element 26 about the roll and tilt axes.

Once the desired alignment of the optical element 26 is achieved, fasteners 84 and 86 are tightened to a final torque, and stop member 78 is placed in compression between base 42 and cover 62. In this state, cover 62 is slightly flexed, and housing 46 is clamped between the interfacing surfaces of the base and cover. Surface-to-surface contact between surface 52 and surfaces 60 and 66 is maintained in this clamped state, but a higher level of frictional engagement therebetween is achieved, and movement of the housing relative to the base and cover is prevented, even during periods of the device undergoing substantial vibration, such as may be experienced during a rocket launch. Thus, the clamped interface between the spherical outer surface of housing 46 and the spherical inner surfaces 60 and 66 of the base and cover contribute to the vibration stability of the inventive adjustable optical device.

Referring now to FIG. 3b, it can be seen that housing 46 is comprised of first and second interfitted hemispherical housing portions 90 and 92, respectively, with optical element 26 mounted in a cavity 93 formed in second housing portion 92. Second housing portion 92 is also provided with opening 94 through which output axis 28a extends (should optical element 26 happen to be a beam splitter). Stem 54 is provided with threaded portion 100 which is received in tapped hole 102 provided in second housing portion 92. The first and second housing portions are attached together by means of a plurality of fasteners 96, the heads of which are recessed below outer spherical surface 52. Proper alignment of the first and second housing portions is ensured through alignment pins 97 which extend from second housing portion 92 and are received within mating alignment holes provided in first housing portion 90. Within cavity 93, optical element 26 rests on a resilient surface(s) of a suitable material such as rubber which maintains the proper orientation of surface 27 relative to the spherical center of housing 46 during thermal expansion and contraction of housing 46 relative to optical element 26. The resilient material may be in the form of a plurality of pads 98, as shown. Resilient pads 98 retain optical element 26 in its proper location relative to housing 46 during and after periods of substantial vibration, and contribute to the vibration stability of the inventive device.

Housing 46, base 42, cover 62, spacer member 76, stop member 78, and shim(s) 36 (if any) are all made of a common material, such as aluminum, for example, or materials having a common coefficient of thermal expansion, thus allowing each of these components to expand and contract to a similar extent in response to variations in temperature without altering the adjustment of the optical element about the roll and tilt axes, or relative to mounting plate 22, thereby providing a thermally stable device. Fasteners 80, 82, 84, 86 and 96 may be made of aluminum or brass, or materials having a substantially similar coefficient of thermal expansion to that of the material(s) of housing 46, base 42, cover 62, spacer member 76 and stop member 78. Further, satellite chassis 24 may be made of a material having a coefficient of thermal expansion which is substantially similar to that of the inventive device's components.

FIG. 1c illustrates a second embodiment of an adjustable optical device according to the present invention. Adjustable optical device 20a comprises base 42a which provides a plurality of inner spherical surfaces 60 which interface with a plurality of housings 46 as described above, each containing an optical element 26. Rather than individual attachment of a plurality of bases 42 to the chassis, as shown in the example of a satellite in FIG. 1b, a single base 42a may be attached to the chassis, thereby simplifying assembly. The material of base 42a is the same as used in base 42, and the remaining componentry of device 20a is as described above with regard to device 20. Adjustable optical device 20a, which is not shown attached to its associated chassis in FIG. 1c, receives radiation input along input axes 28, and directs a plurality of radiation output from the device along a plurality of output axes 30 in the manner described herein above. Notably, each optical element 26 of device 20a is independently adjustable in the same manner, and using the same adjustment device, as the optical element 26 of device 20 is.

Referring now to FIGS. 1 and 4, there is shown adjustment device 104 comprising body 106, front plate 108, which is attached to body 106 by fasteners 109, and rear plate 110, which is attached to body 106 by fasteners 111. As mentioned above, adjustment device 104 may be used with adjustable optical device 20 or 20a. Adjustment device 104 includes an adjustment mechanism comprising lever 112, one end of which is provided with receptacle portion 113 within which is frustoconical driving surface 114, against which frustoconical driven surface 56 is engaged during adjustment. Adjacent receptacle portion 113, the exterior of lever 112 is provided with flange 116. Abuttingly disposed between flange 116 and the interior, annular facing surface of front plate 108 is disposed compression spring 118, which urges flange against surface 119 of body 106. The portion of lever 112 on the side of flange 116 which is opposite receptacle portion 113 extends into cavity 117 formed through body 106.

Lever 112 is provided with longitudinal bore 131 (FIGS. 5a, 5b) through which extends screw 152. Screw 152 is temporarily threadedly engaged with tapped hole 154 in stem 54 while adjustment device 104 is engaged with optical device 20, 20a, to retain the adjustment device to the optical device during adjusting procedures and to ensure proper engagement of respective frustoconical driving and driven surfaces 114 and 56. The head of screw 152 is accessed through hole 156 in rear plate 110.

The adjustment mechanism further comprises springs 120 and 122 which extend from cavity 117 through holes provided in the side of body 106 and abut retainer plate 124. Retainer plate 124 is attached to body 106 by means of fasteners 126. Springs 120 and 122 engage portion 127 of lever 112. Portion 127 includes counterbores 129 into which an end of each spring 120, 122 are disposed. Springs 120 and 122 urge lever portion 127 away from retainer plate 124, and lever 112 pivots about optical center 35 in response to movement of portion 127. First and second lead screws 128, 130, respectively, extend through cavity 117 alongside lever portion 127. First and second wedges 132 and 134 are disposed in cavity 117 and are respectively threadedly received on lead screws 128 and 130. Engagement surfaces 135, 136 of wedges 132, 134, respectively, faces directions which are substantially perpendicular to each other and slidably engage lever portion 127. Springs 120 and 122 urge lever portion 127 into sliding contact with engagement surface 136 of wedge 134 and engagement surface 135 of wedge 132. Rotation of the lead screws individually imparts movement of the wedges along the length of lever portion 127, thereby inducing pivoting motion to lever 112.

Figure 5A:
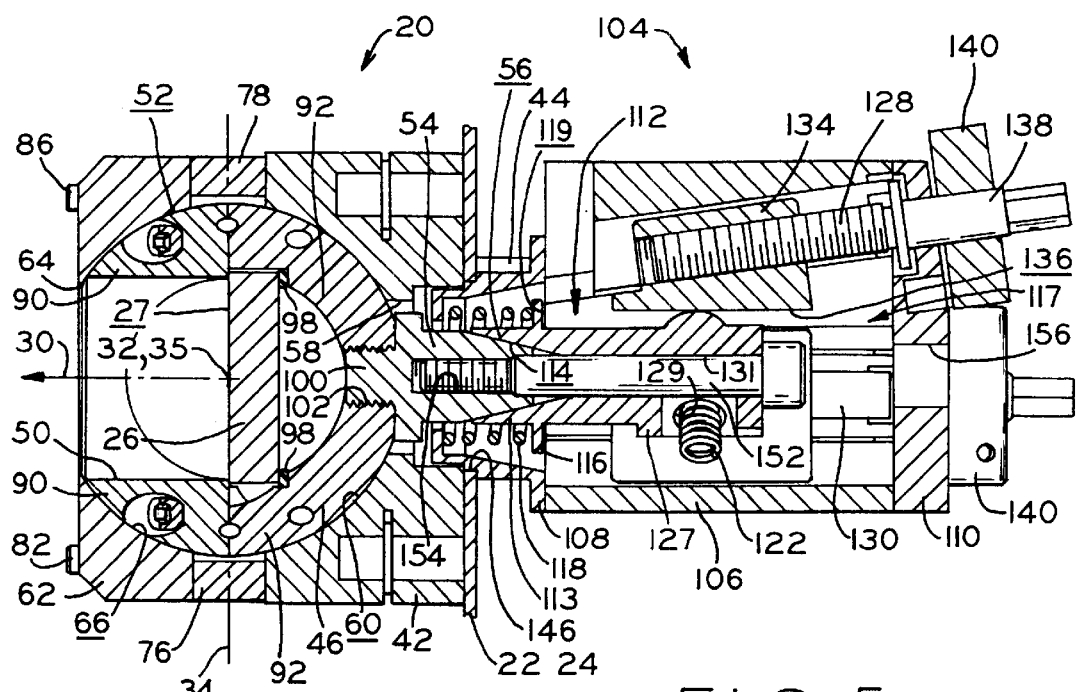
FIG. 5a is a first cross sectional side view of the assemblage shown in FIG. 1.
Figure 5B:
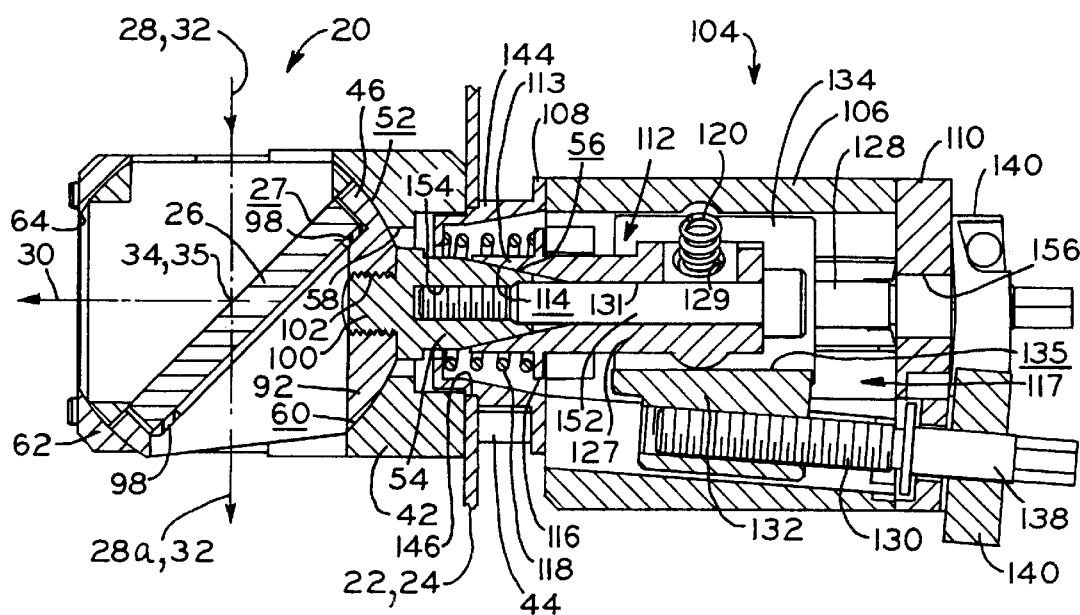
FIG. 5b is a second cross sectional side view of the assemblage shown in FIG. 1.
Figure 10A:
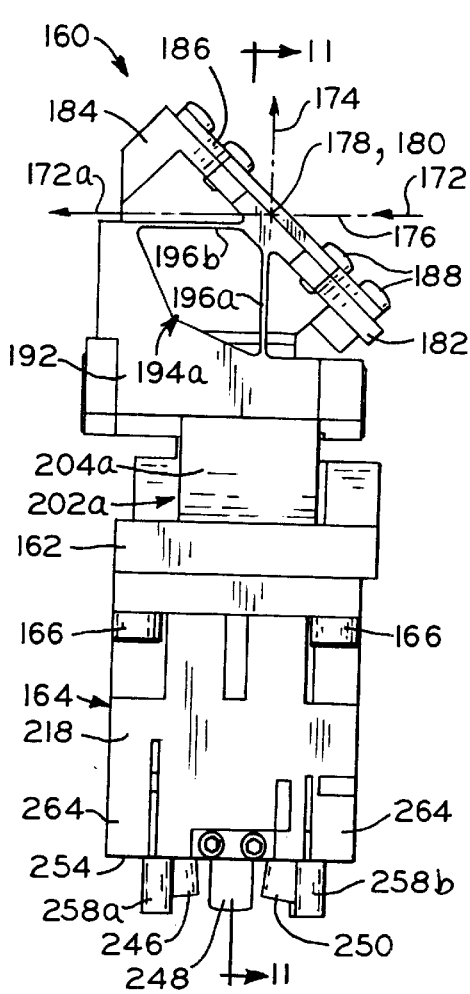
FIG. 10a is a side view of the adjustable optical device of FIG. 7.
Figure 10B:
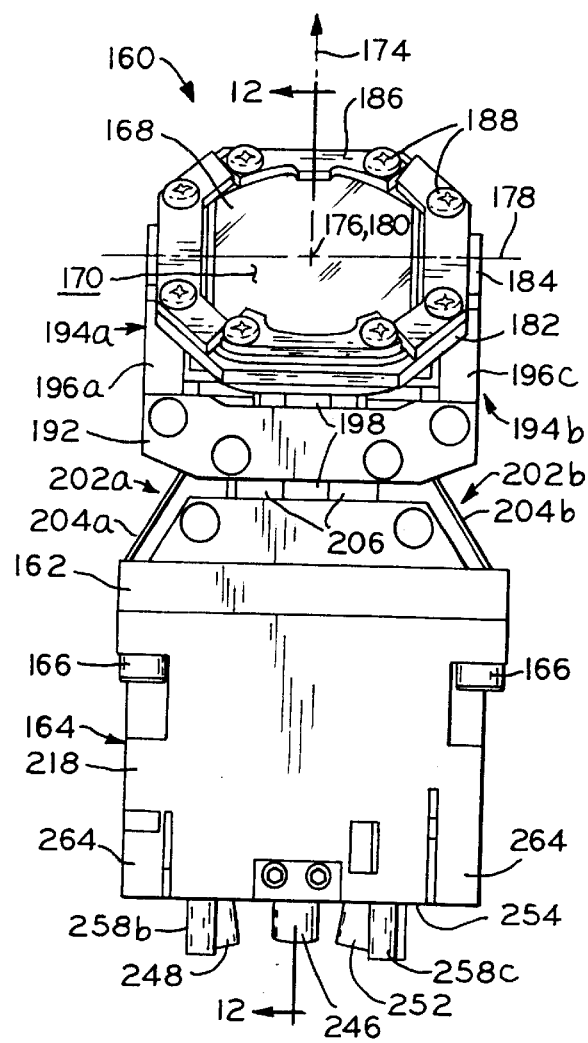
FIG. 10b is a front view of the adjustable optical device of FIG. 7.
Figure 10C:
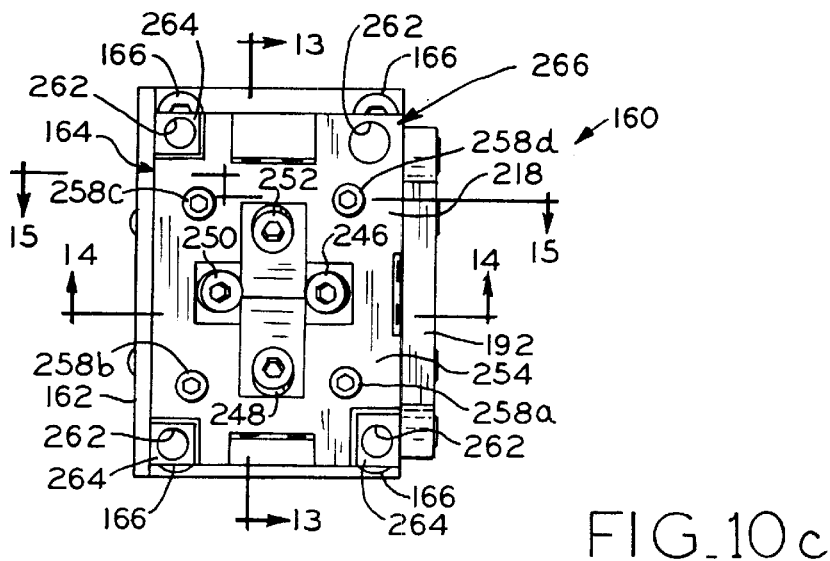
FIG. 10c is a bottom view of the adjustable optical device of FIG. 7.

FIG. 5a shows a section generally along a plane in which output axis 30 lies and which is normal to roll axis 32; FIG. 5b shows a section generally along a plane in which output axis 30 lies and which is normal to tilt axis 34. Referring to FIGS. 5a and 5b in particular, it can be seen that generally cylindrical boss portion 144 of front plate 108 is received in round hole 146 provided in mounting plate 22. A step provided on boss portion 144 is seated against the facing surface of front plate 108, and in this position adjustment device 104 is seated onto mounting plate 22 and in its operating position relative to base 42 of optical device 20. Alignment pins 44, which extend from base bottom surface 41 and through mounting plate 22, are received in mating alignment holes 148 provided in front plate 108, thereby properly angularly aligning adjusting device 104 to optical device 20. As mentioned above, adjustment device 104 is temporarily attached, in its operating position, to adjustable optical device 20, 20a through engagement of screw 152 in hole 154 of stem 54. When adjustment device 104 is held in its operating position, driven surface 56 of optical device 20 is engaged with driving surface 114 of lever receptacle 113. It can now be readily understood that, with driving and driven surfaces 114 and 56 so engaged, pivoting motion of lever 112 relative to the remainder of adjustment device 104 (and relative to optical device 20) in response to movement of wedges 132, 134 along their respective lead screws will cause housing 46 to be rotated about one or both of its roll and tilt axes. Rotation of lead screw 128 imparts movement to optical element 26 about roll axis 32. Rotation of lead screw 130 imparts movement to optical element 26 about tilt axis 34.

Ends 138 of the lead screws extend through rear plate 110 and have fitted thereon knobs 140. Knobs 140 are manually rotated and impart rotation to lead screws 132 and 130. The surface of each of knobs 140 adjacent the axially facing exterior surface of rear plate 110 is provided with a plurality of circumferentially distributed detents which interact with a spring-biased balls (not shown) fitted to rear plate 110 to provide a tactile indication of incremental angular movement of the lead screws. Detents 142 thus give the operator adjusting knobs 140 an indication of the angle through which the knob has been rotated between detents. Knob 140 may be provided with detents at, for example, 30° increments. The number of detent positions felt correspond to a particular angular adjustment (e.g., a certain number of microradians) of optical element 26 about the tilt or roll axis associated with that knob. Optical element 26 has a range of motion about its roll axis of approximately ±20 milliradians (mrad), and the inventive adjustment device provides the optical element with approximately 0.1 mrad of angular resolution thereabout. Optical element 26 has a range of motion about its tilt axis of approximately ±10 mrad, and the inventive adjustment provides the optical element with approximately 0.05 mrad of angular resolution thereabout.

Once the desired position of the optical element relative to satellite chassis 24 has been achieved through manipulation of knobs 140, fasteners 84 and 86 are torqued, thereby placing stop member 78 in compression, and tightening the interface between housing outer surface 52, base inner surface 60, and cover inner surface 66. Once fasteners 84 and 86 are tightened, relative movement between housing 46 and the remainder of optical device 20 is prevented, and adjustment device 104 may be removed from its operating position by merely disengaging screw 152 from hole 154 and separating the adjustment device from the optical device. Each of the plurality of optical devices 20 mounted on satellite chassis 24 may be adjusted in turn by a single adjustment device 104. Because adjusting device 104 is detachable, the weight of the satellite in its flying configuration does not include the adjusting device.

Referring now to FIGS. 6a and 6b there is shown a third embodiment of an optical device 20' and associated adjustment device 104' according to the present invention. FIG. 6a corresponds closely to FIG. 5a, and FIG. 6b corresponds closely to FIG. 5b. Between the first, second and third embodiments, identical elements are identically referenced; elements of the third embodiment which functionally correspond to elements of the first embodiment are identified with primed, corresponding reference numbers. Adjustable optical device 20' is identical to device 20 except that instead of having stem 54, second housing portion 92' is provided with a cavity 150 having frustoconical driven surface 56' which, when adjustment device 104' is in its operating position, is engaged with driving surface 114' of lever 112', which has no receptacle portion or screw 152 extending longitudinally therethrough. Other portions of lever 112' and device 104' are otherwise identical to the above-described first embodiment. Movement of lever 112' in response to movement of wedge 132 or 134 induces rotation of optical element 26 about its tilt or roll axis, respectively. As described above, once the desired orientation of housing 46' relative to satellite chassis 24 has been obtained, fasteners 84, 86 are torqued, bringing stop member 78 into compression and providing a second level of friction engagement between outer housing surface 52' and the adjacent spherical inner surfaces of base 42 and cover 62.

FIGS. 7–14 depict various views of a fourth embodiment of an adjustable optical device according to the present invention. Adjustable optical device 160 comprises base 162 and adjusting mechanism 164 which are fixed together by means of fasteners 166. A plurality of optical devices 160 may be arranged on and attached to a satellite chassis which is similar to that described above or to an earth-bound relay optics system chassis (not shown).

Optical device 160 comprises optical element 168, which may be a fold mirror or beam splitter, as described above, and which has reflective optical surface 170. Radiation or other light is received onto optical surface 170 along input axis 172 and is directed away from surface 170 along output axis 174 toward another optical device or a detector (not shown). If optical element 168 is a beam splitter, a portion of the light received along input axis 172 passes through the optical element and continues along output axis 172a toward a detector or another optical element. Roll axis 176 and tilt axis 178, which are perpendicular, intersect on optical surface 170 at its optical center 180. The roll and tilt axes are fixed relative to the device, as described above, and the optical element is rotated in the directions indicated by arrow T about the tilt axis, or rotated in the directions indicated by arrow R about the roll axis (FIG. 8b). As shown, roll axis 176 is collinear with input axis 172, but these are individual axes which may be slightly displaced relative to one another.

Optical element 168 is fixed to optical tray 182 which is an integral portion of housing 184. Frame 186 is fastened over optical element 168 and attached to optical tray 182 by means of a plurality of fasteners 188. As shown in FIGS. 8a and 8b, housing 184 is provided with hole 190 through which output axis 172a extends, should optical element 168 be a beam splitter.

Optical device 160 further comprises intermediate member 192 disposed between housing 184 and base 162. Housing 184 is flexibly connected to intermediate member 192 by means of first flexure mechanism 194 having a first portion 194a and a second portion 194b located on opposite sides of housing 184 as shown. Flexure mechanism 194 comprises first flexure elements 196a, 196b, which comprise its first portion 194a, and first flexure elements 196c and 196d, which comprise its second portion 194b. First flexure elements 196 are each flat and bend in planes which are normal to tilt axis 178. Notably, first and second portions 194a and 194b may respectively be comprised of additional first flexure elements 196; it is envisioned however, that within each portion 194a and 194b, first flexure elements 196 will be oriented such that extensions of their individual longitudinal axes intersect at a common point. First flexure elements 196 may be an integral part of housing 184 and/or intermediate member 192. Alternatively, first flexure elements 196 may be individual flexure elements which are attached to both housing 184 and intermediate member 192. As shown, first flexure elements 196 are integral to and extend between portions of both intermediate member 192 and housing 184. Also, as shown, intermediate member 192 comprises a plurality of interconnected components. What ultimately distinguishes the housing from the intermediate member, however is the flexible connection therebetween, as through first flexure elements 196.

Referring to FIG. 8b, fixed to housing 184 and extending through intermediate member 192 and base 162 is housing adjusting post 198. Housing adjusting post 198 has a plane of movement in which arrow 200 lies, and tilt axis 178 is normal to this plane of movement. The movement of housing adjusting post 198 in the directions indicated by arrow 200 is about tilt axis 178. Were intermediate member 192 fixed, movement of housing adjusting post 198 in the directions of arrow 200 would induce rotation of optical element 168 about tilt axis 178 against the resilient bias of first flexure mechanism 194.

Intermediate member 192, however, is flexibly connected to base 162 by means of second flexure mechanism 202, which comprises first portion 202a and second portion 202b located on opposite sides of the intermediate member as shown. First portion 202a of second flexure mechanism 202 comprises second flexure element 204a, and second portion 202b of second flexure mechanism 202 comprises second flexure element 204b. Each of flexure elements 204a and 204b are substantially flat and may be integral with intermediate member 192 and/or base 162. Alternatively, these second flexure elements may be individually attached to the intermediate member and the base.

Fixed to intermediate member 192 and extending through base 162 is intermediate member adjusting post 206, which has a plane of movement in which arrow 208 (FIG. 8b) lies. The plane of movement of intermediate member adjusting post 206 is normal to roll axis 176 and movement of post 206 along the directions indicated by arrow 208 is about roll axis 176. Intermediate member adjusting post 206 is provided with cavity 210 which extends along its length. Cavity 210 has opposed side walls 214 and 216 which slidably engage the interfacing side surfaces of housing adjusting post 198, which is located within cavity 210. Thus it can be understood that movement of intermediate member adjusting post 206 along the directions indicated by arrow 208 induces movement of housing adjusting post 198 along the directions indicated by arrow 208 as well. In other words, the plane of movement of housing adjusting post 198 pivots about roll axis 176 with intermediate member adjusting post 206. Further, it is to be understood that at any position of intermediate member adjusting post 206 in its plane of movement, housing adjusting post 198 may be moved in its respective plane of movement in the directions indicated by arrow 200. Movement of housing adjusting post 198 in its plane of movement (normal to tilt axis 178) adjusts optical element 168 about tilt axis 178, whereas movement of intermediate adjusting post 206 in its plane of movement (normal to roll axis 176) adjusts optical element 168 about roll axis 176. It can thus be readily understood that adjustment of the optical element is accomplished by urging the two adjusting posts in their respective planes of movement, along arrows 200 or 208, against the resilient biasing forces of the first or second flexure mechanisms, which tend to orient adjusting posts 198 and 206 into a neutral position along axis 212, which extends in a direction generally perpendicular to the roll and tilt axes and generally parallel with output axis 174 (FIG. 8b).

Adjusting mechanism 164 comprises body 218 provided with cross-shaped cavity 220 formed by four recesses 221a–d extending radially from the center of the cavity, into which adjusting posts 198 and 206 extend along axis 212. The four recesses form equal length "arms" of the "cross" in planes taken along the axial direction of body 218. Referring to FIGS. 11–14, it can be seen that the lengths of these arms vary with the distance along the length of body 218, as the radially outer walls of these four recesses slope outwardly from the "bottom" of body 218 towards base 162. Slidably disposed within recess 221a is first wedge 222; slidably disposed within recess 221b is second wedge 224; slidably disposed within recess 221c is third wedge 226; and slidably disposed within recess 221d is fourth wedge 228. Each wedge is in sliding engagement with the three flat walls forming its respective recess. One of the three flat walls forming each recess 221a–d is itself defined by an associated wedge-shaped locking member 229a–d which is integral to body 218 and attached at one end to the remainder of body 218 by resilient, deflecting portion 256a–d; FIG. 15 illustrates the representative structure of member 229d and its resilient, deflecting portion 256d. As will be further discussed hereinbelow, once optical element has been properly adjusted, wedges 222, 224, 226 and 228 are locked within their respective recesses 221a–d to prevent inadvertent movement thereof, which may alter the adjusted position of the optical element.

Referring to FIGS. 8b, 9b, 12 and 14, first wedge 222 has angled engagement surface 230 which interfaces curved projecting surface 238 of housing adjusting post 198. Similarly, third wedge 226 has angled engagement surface 234 which interfaces curved projecting surface 242 of housing adjusting post 198.

Referring to FIGS. 8b, 9b, 11 and 13, second wedge 224 has angled engagement surface 232 which interfaces curved projecting surface 240 of intermediate member adjusting post 206. Similarly, fourth wedge 228 has angled engagement surface 236 which interfaces curved projecting surface 244 of intermediate member adjusting post 206.

Wedges 222, 224, 226 and 228 are respectively threadedly disposed on lead screws 246, 248, 250 and 252 which extend into cavity 220 through holes 253 which extend through "bottom" wall 254 of body 218. Lead screws 246, 248, 250 and 252 are disposed within cavity 220 at an angle relative to axis 212, each generally parallel with the outer radial wall of the cavity recess along which it extends. The wedges of each opposed pair of wedges (first wedge 222 and third wedge 226; and second wedge 224 and fourth wedge 228) are located at opposite axial ends of cavity 220 and are driven toward each other as they are brought into contact with the curved projecting surface of the adjusting arms which interfaces with its respective engagement surface. This aspect is best seen in FIGS. 11–14: For example, note that opposed pair of wedges 224 and 228 are shown in FIG. 11 to be located at opposite axial ends of cavity 220, with wedge 228 located above wedge 224 in the drawing. Rotation of lead screw 252 in one direction will draw wedge 228 downward, towards curved projecting surface 244 of intermediate member adjusting post 206; similarly rotation of lead screw 250 in one direction will force wedge 224 upward, towards curved projecting surface 240 of intermediate adjusting post 206.

Further, with reference to FIGS. 11–14, the engagement surface of each wedge is oriented such that, if slid along the interfacing curved projecting surface of an adjusting post, the post will be urged toward the engagement surface of the oppositely located wedge. The various cross sectional views provided in FIGS. 11–14 show optical device 160 in a locked position wherein no relative movement of optical element 168 about either the roll or tilt axis is permitted. The engagement surfaces of each respective wedge is in abutting contact with its interfacing curved projecting surface on housing adjusting post 198 or intermediate member adjusting post 206.

The method of imparting adjustment to the optical element about roll axis 176 is as follows: referring first to FIG. 11, wedge 228 is first moved towards base 162 by rotation of lead screw 152, thereby providing clearance between surfaces 236 and 244. Lead screw 250 is then rotated to move wedge 224 toward bottom wall 254 of body 218, thereby urging intermediate member adjusting post 206 into clockwise rotation about roll axis 176. This rotation is continued until the optical element 168 achieves its desired roll position about axis 176.

At this point, lead screw 252 is rotated in the direction opposite its prior direction of rotation, thereby bringing wedge 228 away from base 162, and surfaces 236 and 244 are brought into abutting contact. With curved surfaces 240 and 244 respectively abutting wedge surfaces 232 and 236, intermediate member adjusting post 206 is trapped between wedges 224 and 228, and optical element 168 locked thus locked against further rotation about roll axis 176. Conversely, should counterclockwise rotation of the adjusting post and thus the optical element about roll axis 176 be desired, lead screw 250 is first rotated such that its wedge 224 is driven towards base 162, creating clearance between surfaces 232 and 240. Lead screw 252 is then rotated to draw its wedge 228 further from base 162, engagement surface 236 thereof driving surface 244 of the adjusting post rightward in its plane of motion. Once the desired roll adjustment of the optical element has been achieved, lead screw 250 is rotated in a direction opposite that of its prior rotation to draw wedge 224 away from base 162 and bring wedge engagement surface 232 into locking, abutting engagement with surface 240 of the adjustment post. It will be noted that regardless of the direction of rotation of adjusting post 206 about roll axis 176, adjusting post 198 is carried with the adjusting post 206 because it is in sliding engagement with surfaces 214 and 216 of cavity 210. It can thus be readily visualized that the plane of movement of housing adjustment post 198, which is perpendicular to the plane of the drawing sheet, is rotated about roll axis 176 with movement of adjustment post 206.

Similarly, with respect to adjustment of optical element 168 about tilt axis 178, reference is made to FIG. 12. To impart clockwise rotation of the optical element 168 about tilt axis 178, lead screw 250 is first rotated so as to drive wedge 226 towards base 162, thereby creating clearance between surfaces 234 and 242. Lead screw 246 is then rotated such that wedge 222 is drawn towards bottom wall 254, thereby urging housing adjusting post 198 leftward in the drawing, and housing 184 clockwise about tilt axis 178. Once the desired adjustment about tilt axis 178 has been achieved, lead screw 250 is rotated in a direction opposite to that of its prior rotation, bringing wedge 226 away from base 162 and bringing surface 234 of the wedge into locking engagement with curved projecting surface 242 of the housing adjusting post. Conversely, counterclockwise rotation of housing 184 about tilt axis 178 is achieved by first rotating lead screw 246 so as to force wedge 222 upwards towards base 162, creating clearance between surfaces 230 and 238. Screw 250 is then rotated to draw wedge 226 away from base 162, its engaging surface 234 sliding against surface 242 of post 198, urging the post rightward in FIG. 12.

Optical device 160 may be adjusted generally along the direction of output axis 174 by means of shim(s) placed between bottom wall 254 and the chassis mounting plate, in the manner described above with respect to optical device 20. It is envisioned that the range of adjustment of the optical center generally along the axis of output axis 174 which should be accommodated with device 160 is on the order of ±0.04 inch, with the shim(s) individually providing a linear resolution of about 0.002 inch. Optical element 168 has a range of motion about its roll axis of approximately ±20 milliradians (mrad), and the inventive adjustment device provides the optical element with approximately 0.1 mrad of angular resolution thereabout. Optical element 168 has a range of motion about its tilt axis of approximately ±10 mrad, and the inventive adjustment provides the optical element with approximately 0.05 mrad of angular resolution thereabout.

Once the desired orientation about tilt axis 178 has been achieved, lead screw 246 is rotated in a direction opposite to that of its prior rotation, drawing wedge 222 away from base 162 and bringing its surface 230 brought into locking engagement with surface 238 of adjusting post 198. With reference to FIG. 15, once optical element has been properly adjusted and the adjusting posts locked are between their respective pairs of opposed wedges, each wedge 222, 224, 226 and 228 is locked in position within its respective recess 221a–d to prevent their inadvertent movement, which may alter the adjusted position of the optical element. Locking screws 258a–d, the tips of which respectively slidably engage angled surfaces 260a–d of locking members 229a–d, are tightened, thereby urging locking members 229 towards their adjacent wedges. Each wedge is thus compressed between the adjacent, abutting surfaces of its recess, and thereby locked in its adjusted position. By this means, backlash between lead screws 246, 248, 250 and 252 and their respective wedges 222, 224, 226 and 228 is eliminated as a factor by which the wedges may be allowed to move from their adjusted positions. Because the wedges are prevented from moving, movement of the adjusting posts, and thus of the optical element, relative to body 218 is prevented, and vibration-stability of the adjustment device is ensured.

It is to be noted that adjustment of optical element 168 about tilt axis 178 does not necessarily involve any movement of intermediate member adjusting post 206, which may remain locked in its previously adjusted position. Further, it is to be noted that adjustment about the tilt and roll axes need not be performed in any particular order, and adjusting posts 198 and 206 may be moved independently of one another to adjust the optical element.

As in the first, second and third embodiments, thermal stability is achieved by using common, suitable materials, or materials having substantially similar coefficients of thermal expansion in forming the flexure mechanisms, housing 184, intermediate member 192, base 162, and the body and wedge elements of adjustment mechanism 164. The chassis to which the device is attached may also be made of material common to that of the components of device 160, or of a material having a substantially similar coefficient of thermal expansion.

Adjustable optical device 160 is attached to its chassis- in by means of fasteners (not shown) which extend through the chassis mounting plate (not shown) and are threadedly received in holes 262 provided in the four corners of bottom wall 254 of body 218 . As shown best in FIGS. 9a, 9b and 10c, three of these four corners of body 218 include integral portions 264 which are resiliently connected to the remainder of body 218. A hole 262 is provided in each of portions 264, as well as in the corner which is not provided with an integral, resilient portion 264, which is referred to herein as rigid corner 266. Strains associated with stresses within body 218 which result from its attachment to the chassis, or to possible relative thermal expansions and contractions between the device and the chassis, are absorbed by the deflection of portions 264, thereby allowing the remainder of body 218, the stability of which is relied upon for maintaining correct adjustment of optical element 168, to be remain isolated from such influences. Body 218 is rigidly affixed to the chassis through the attachment at rigid corner 266.

While this invention has been described as having a various designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An adjustable optical device comprising:
   an optical element;
   a housing having an adjusting post fixed thereto, said optical element mounted to said housing, said housing adjusting post having a plane of movement; and
   an adjustment mechanism, said housing flexibly connected to said adjustment mechanism, said adjustment mechanism comprising a moving adjusting member in sliding engagement with said housing adjusting post, one of said adjusting member and said housing adjusting post comprising a wedge, wherein said housing adjusting post is urged into movement in its said plane of movement in response to relative movement between said adjusting member and said adjusting post, whereby the orientation of said optical element relative to said adjusting mechanism is adjusted by movement of said moving adjusting member.

2. The adjustable optical device of claim 1, wherein said housing has substantially perpendicular tilt and roll axes, one of said tilt and roll axes substantially perpendicular to said housing adjusting post plane of movement, and further comprising a base, said housing having movement relative to said base about said one of said tilt and roll axes, said adjusting mechanism attached to said base.

3. The adjustable optical device of claim 2, wherein said optical element has an optical center and said tilt and roll axes intersect at said optical center.

4. The adjustable optical device of claim 2, further comprising an intermediate member disposed between said housing and said base, said intermediate member having an adjusting post fixed thereto, said intermediate member adjusting post having a plane of movement, the other of said tilt and roll axes substantially normal to said intermediate member adjusting post plane of movement, said intermediate member flexibly connected to said housing and to said base, said housing having movement relative to said intermediate member about said one of said tilt and roll axes, said housing having movement relative to said base about both said tilt and roll axes.

5. The adjustable optical device of claim 4, wherein said moving adjusting member is a first moving adjusting member and said wedge is a first wedge, and said adjustment mechanism further comprises a second moving adjusting member in sliding engagement with said intermediate member adjusting post, one of said second adjusting member and said intermediate member adjusting post comprising a second wedge, and wherein said intermediate member adjusting post is urged into movement in its said plane of movement in response to relative movement between said second adjusting member and said intermediate member adjusting post, whereby the orientation of said optical element relative to said base is adjusted by movement of said second moving adjusting member.

6. The adjustable optical device of claim 5, wherein said housing adjusting post plane of movement is fixed relative to said intermediate member adjusting post plane of movement.

7. The adjustable optical device of claim 6, wherein said housing adjusting post and said intermediate member adjusting post extend through said base.

8. The adjustable optical device of claim 7, wherein said intermediate member adjusting post has a longitudinal axis, said intermediate member adjusting post provided with a cavity which extends along its said longitudinal axis and laterally through said intermediate member adjusting post, said housing adjusting arm disposed within said cavity.

9. The adjustable optical device of claim 8, wherein said cavity is provided with opposed interior side walls, said housing adjusting post in sliding engagement with said opposed side walls, whereby said housing adjusting post plane of movement is moved with said intermediate member adjusting post in said intermediate member adjusting post plane of movement.

10. The adjustable optical device of claim 9, wherein said housing adjusting post is provided with oppositely facing first and second side surfaces, said first moving adjusting member is in selective sliding engagement with one of said housing adjusting post first and second side surfaces, and further comprising a third moving adjusting member in selective abutting contact with the other of said housing adjusting post first and second side surfaces, whereby said housing adjusting post is locked between said first and third adjusting members, relative movement between said housing and said intermediate member thereby restrained.

11. The adjustable optical device of claim 10, wherein said intermediate member adjusting post is provided with oppositely facing first and second side surfaces, said second moving adjusting member is in selective sliding engagement with one of said intermediate member adjusting post first and second side surfaces, and further comprising a fourth moving adjusting member in selective abutting contact with the other of said intermediate member adjusting post first and second side surfaces, whereby said intermediate member adjusting post is locked between said second and fourth adjusting members, relative movement between said intermediate member and said base thereby restrained.

12. The adjustable optical device of claim 5, wherein said first and second moving adjusting members respectively comprise first and second rotating lead screws, and said first and second wedges are respectively threadedly engaged on first and second rotating lead screws, said wedges moved in response to rotation of said lead screws.

13. The adjustable optical device of claim 5, wherein said housing and said intermediate member are connected through a first elastically yieldable flexure element having one end which is attached to said housing and another end opposite its said one end which is attached to said intermediate member.

14. The adjustable optical device of claim 13, wherein said first flexure element is substantially flat.

15. The adjustable optical device of claim 13, wherein said intermediate member and said base are connected through a second elastically yieldable flexure element having one end which is attached to said intermediate member and another end opposite its said one end which is attached to said base.

16. The adjustable optical device of claim 15, wherein said second flexure element is substantially flat.

17. An adjustable optical device comprising:
an optical element;
a base having a substantially spherical inner surface;
a housing, said optical element disposed within said housing, said housing having a substantially spherical outer surface engaged with said base substantially spherical inner surface, said housing provided with a driven surface, said housing having a tilt axis and a roll axis about which the orientation of said housing relative to said base is adjusted; and
an adjustment device having an operating position relative to said base, said adjustment device comprising a moving adjusting mechanism which includes a driving surface, said driven and driving surfaces engaged in said operating position, said adjusting mechanism comprising a lever operatively connected to said driving surface, said lever having two substantially perpendicular degrees of movement, wherein movement of said housing about one of its said tilt and roll axes is in response to movement of said lever along one of its said degrees of movement.

18. The adjustable optical device of claim 17, further comprising a cover having a substantially spherical inner surface engaged with said housing substantially spherical outer surface, said housing releaseably clamped between said cover and said base.

19. The adjustable optical device of claim 17, wherein said tilt axis and said roll axis intersect at the spherical center of said housing outer surface.

20. The adjustable optical device of claim 19, wherein said optical element has a reflective surface, said housing outer surface spherical center located on said reflective surface.

21. The adjustable optical device of claim 17, wherein said adjusting mechanism comprises two perpendicularly facing moving wedges, said wedges in sliding contact with said lever, said lever moved in one of its two degrees of movement in response to movement of a said wedge.

22. The adjustable optical device of claim 21, wherein said adjusting mechanism comprises a lead screw threadedly engaged with each said wedge, each said wedge moved in response to rotation of its respective said lead screw.

23. The adjustable optical device of claim 22, wherein each said lead screw is provided with means for indicating that the said lead screw has been rotated through a predetermined angle.

24. The adjustable optical device of claim 17, wherein said adjustment device is removably located in its said operating position.

25. An adjustable optical device comprising:

an optical element;

a base;

a housing, said optical element mounted in said housing, said housing coupled to said base and in substantially surface-to-surface contact therewith, said housing having at least one degree of movement relative to said base, whereby the orientation of said optical element relative to said base is adjusted by the movement of said housing in said at least one degree of movement, said housing being selectively locked to said base; and an adjustment device detachably connected to said base and having a moving adjusting mechanism, and wherein, when said adjustment device is connected to said base, said adjusting mechanism is operatively connected to said housing to move said housing in its said at least one degree of movement in response to movement of said adjusting mechanism, said housing remaining selectively locked to said base when said adjustment device is detached from said base.

26. The adjustable optical device of claim 25, wherein said housing has two degrees of movement, one of said housing degrees of movement about a tilt axis which extends through said optical element, the other of said housing degrees of movement about a roll axis which extends through said optical element, said tilt and axes substantially perpendicular to each other.

27. An adjustable optical device comprising:

an optical element;

a base;

a housing, said optical element mounted in said housing, said housing coupled to said base and having two degrees of movement relative to said base, one of said housing degrees of movement being about a tilt axis which extends through said optical element, the other of said housing degrees of movement being about a roll axis which extends through said optical element, said tilt and roll axes substantially perpendicular to each other, whereby the orientation of said optical element relative to said base is adjusted by the movement of said housing in at least one said degree of movement, said housing being selectively locked to said base;

a stem fixed to said housing, said stem extending from said housing into said base, movement of said stem relative to said base imparted to said housing, whereby said housing is moved about one of said tilt and roll axes; and an adjustment device detachably connected to said base and having a moving adjusting mechanism, and wherein, when said adjustment device is connected to said base, said adjusting mechanism is operatively connected to said housing to move said housing in at least one said degree of movement in response to movement of said adjusting mechanism, said housing remaining selectively locked to said base when said adjustment device is detached from said base.

28. The adjustable optical device of claim 27, wherein said adjusting mechanism comprises a receptacle and a lever, said stem received in said receptacle, said receptacle attached to said lever, said lever having two substantially perpendicular degrees of movement, said housing moved about one of said tilt and roll axes in response to movement of said lever in one of its said degrees of movement.

* * * * *

UNITED STATES PATENT AND TRADEMARK OFFICE
CERTIFICATE OF CORRECTION

PATENT NO.    : 6,519,101 B2
DATED         : February 11, 2003
INVENTOR(S)   : Alan David Bell et al.

It is certified that error appears in the above-identified patent and that said Letters Patent is hereby corrected as shown below:

<u>Column 1,</u>
Line 9, before "Background of the Invention", please insert the following paragraph:
-- The U.S. Government has a paid-up license in this invention and the right in limited circumstances to require the patent owner to license others on reasonable terms as provided for by the terms of Contract No. NAS5-32981 awarded by NASA. --

Signed and Sealed this

Thirteenth Day of July, 2004

JON W. DUDAS
*Acting Director of the United States Patent and Trademark Office*